United States Patent [19]

Chen

[11] Patent Number: 4,812,841

[45] Date of Patent: Mar. 14, 1989

[54] COMPUTER-CONTROLLED PASSWORD LOCK

[76] Inventor: Hai C. Chen, Fl. 3, 36, Han Sheng W. Rd., Panchiao, Taiwan

[21] Appl. No.: 53,731

[22] Filed: May 26, 1987

[51] Int. Cl.[4] .......... H04Q 9/00

[52] U.S. Cl. .......... 340/825.31; 340/543; 70/278

[58] Field of Search .......... 340/825.3, 825.31, 825.32, 340/542, 543, 528; 235/382, 382.5; 70/278, 271, 277; 361/172

[56] References Cited

U.S. PATENT DOCUMENTS

| | | | |
|---|---|---|---|
| 3,953,769 | 4/1976 | Sopko | 340/825.31 |
| 4,333,090 | 6/1982 | Hirsch | 340/825.3 |
| 4,502,048 | 2/1985 | Rehm | 340/825.31 |
| 4,604,708 | 8/1986 | Lewis | 340/825.31 |

FOREIGN PATENT DOCUMENTS

| | | | |
|---|---|---|---|
| 1169948 | 6/1984 | Canada | 70/278 |
| 0021670 | 1/1981 | European Pat. Off. | 340/543 |
| 2120434 | 11/1983 | United Kingdom | 70/278 |

*Primary Examiner*—John W. Caldwell, Sr.
*Assistant Examiner*—Edwin C. Holloway, III
*Attorney, Agent, or Firm*—Fleit, Jacobson, Cohn & Price

[57] ABSTRACT

A computer-controlled password lock system having a user operated keyboard to key in and reset a password. An indicator visually displays at least one code symbol varying with time. A memory device stores a current password including at least two code symbols so that upon entry of a keyed-in password code through the keyboard, one of the stored password code symbols of the current password is replaced by the time varying code symbol and password then compared with the keyed-in password code to generate a lock opening signal when coincidence occurs. In response to non-coincidence, an alerting signal is generated to indicate the incorrect password condition.

2 Claims, 3 Drawing Sheets

COMPUTER-CONTROLLED PASSWORD LOCK

BACKGROUND OF THE INVENTION

The present invention relates to a computercontrolled password lock, and more particularly to a computer-controlled password lock with its password varying with time.

There are a variety of computer-controller password locks commercially available on the market. --For example, such a computer-controlled lock system is disclosed in U.S. Pat. No. 3,953,769 to Sopko, wherein a keyboard is mounted on the outside of a door and is connected to computer-controlled circuitry enclosed in a housing mounted on the inside of the door to control energization of a deadbolt solenoid. Such a lock system permits a user to open the lock by keying in a correct numeral password from its keyboard, thereby preventing it from being opened with a master key by a thief. With such a computer-controlled lock, the user need not bring a key with him, so that it is not only convenient, but also able to eliminate the possibility of losing the key. In addition, the user can reset the password of the lock as desired, and thus need not worry about anybody, including the one who sells the lock, being aware of the password. Although conventional computer-controlled password locks have the above advantages, they still have several drawbacks, such as the user must memorize a password of four or more figures, and that the length of the password cannot be adjusted. In addition, since the user frequently selects his birthday, part of his telephone number of identification card number, or the like as the password to facilitate memorization, somebody who familiarizes himself with the user may guess at the password.

SUMMARY OF THE INVENTION

The primary object of the present invention is to provide a computer-controlled password lock with its password varying with time. Specifically, at least one figure of the password of the computer-controlled password lock can be set to vary with one figure of the current time or the time displayed on the lock. In addition, the length of the password of said lock can be varied as desired. Therefore, the memorization of the password can be simplified, the setting of the password is more flexible, and the possibility of guessing the password by others is significantly reduced.

In accordance with the present invention, a computer-controlled password lock system for a lock assembly, comprises computer means, coupled to the lock assembly, for controlling the opening of the lock assembly. The computer means includes a keyboard; means for measuring time; means, coupled to the measuring means, for indicating the time measured by the measuring means; means for storing a password preset; means for controlling at least one code symbol of the stored password varying with the time measured by the measuring means; first means, coupled to the keyboard, for receiving a entered password keyed in by a user on the keyboard; and means for comparing the keyed-in password with the stored password to generate an open signal through a lock driving circuit to open the lock assembly when the keyed-in password coincides with the stored password or through an alarm circuit generating an alerting signal to signify a lack of coincidence.

BRIEF DESCRIPTION OF THE DRAWINGS

The present invention can be more fully understood by reference to the following description and acompanying drawings, which form an integral part of this application.

DETAILED DESCRIPTION OF THE PREFERRED EMBODIMENT

Figure 1:
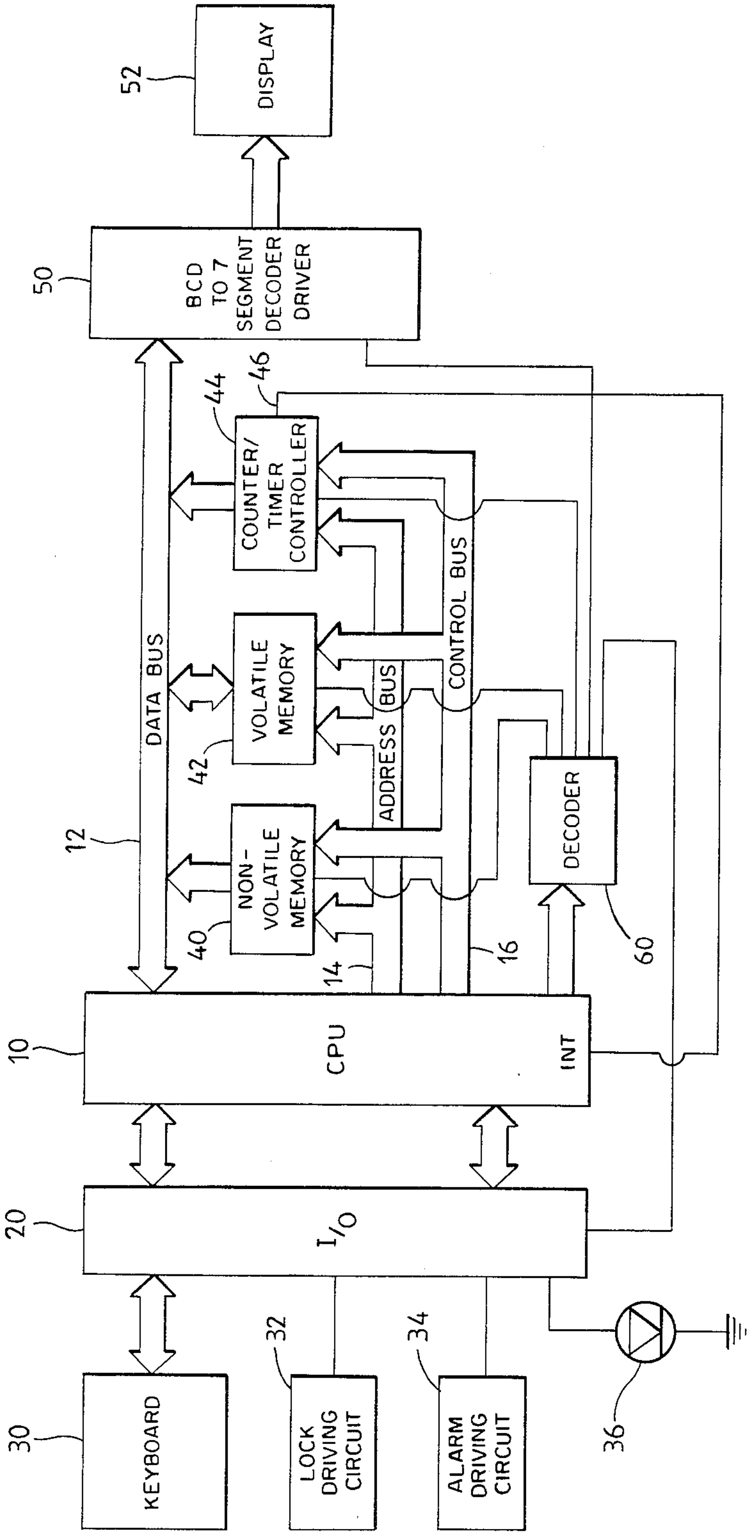
FIG. 1 is a block diagram of the circuitry of the computer-controlled password lock in accordance with the preferred embodiment of the present invention.

Referring now to FIG. 1, the circuitry of the computer-controlled password lock of this invention includes a central processing unit (CPU) 10 capable of running the control programs to control the operation of the password lock. A keyboard 30 from which a user can key in the password, reset the password and set the time is coupled to the CPU 10 via a parallel input/output device 20. The keyboard 30 includes first and second functions keys "*" and "190", and numeral keys "0" to "9" as already well-known in the art. The keyboard 30 may also include other symbolic keys and English alphabet keys.

A non-volatile memory 40, a volatile memory 42 and a counter/timer controller 44 respectively are coupled to the CPU 10 via a data bus 12, address but 14 and control bus 16. The non-volatile memory 40 may be a read-only memory (ROM), erasable-programmable ROM (EPROM), electrically erasable ROM (EEROM) or the like, and is employed to store the control programs and an original password therewithin. The volatile memory 42, such as a random access memory (RAM), is employed to store the current password reset by the user and the data and parameters sent from the CPU 10 therewithin. The counter/timer controller 44 is activated by a control signal sent from the CPU 10, and will output an interrupt signal to the interrupt pin (INT) of the CPU 10 via a line 46 at fixed intervals which are determined by the CPU 10. Therefore, the CPU 10 can measure time in response to the interrupt signal, and store the measured time within the volatile memory 42, thereby establishing an inner clock. A binary-coded-decimal (BCD) to sevensegment decoder/driver 50 is connected to the CPU 10 through the data bus 12 to receive the time measured by the CPU 10, and to convert the BCD input of the measured time into a seven-segment output. The seven-segment output is then sent to a visible display 52 which is coupled to the BCD to seven-segment decoder/driver 50, thus making the time visible to the user.

A decoder 60 is coupled to an controlled by the CPU 10 to selectively activate the parallel input/output device 20, the non-volatile memory 40, volatile memory 42, counter/timer controller 44 or BCD to seven-segment decoder/driver 50.

A lock driving circuit 32, an alarm driving circuit 34 and an indicator or light emitting diode 36 are coupled to the CPU 10 through the parallel input/output device 20. The lock driving circuit 32 is utilized to open the lock by energization of a deadbolt solenoid, for example, as is already well-known in the art exemplified by the Sopko patent aforementioned, in response to an open signal output by the CPU 10 upon the correct password being keyed in by the user. The alarm driving circuit 34 is utilized to drive an alarm system (not shown) in response to an alarm signal output by the CPU 10 upon the number of times an incorrect password is keyed in reaching a predetermined limit, for example three times. The alarm system may be an alarm bell, a system automatically alerting the police, a building alarm system or the like. The light emitting diode (LED) 36 will be turned on for a predetermined period of time, for example two seconds, to indicate that the keyed-in password is incorrect in response to a light signal output by the CPU 10.

The password lock of the present invention can be connected to the commercial power source, and is provided with a chargeable battery. Preferably, the password lock is provided with a receptacle for an external power source. Therefore, the password lock of the present invention will not be affected by the power-failure.

Figure 2:
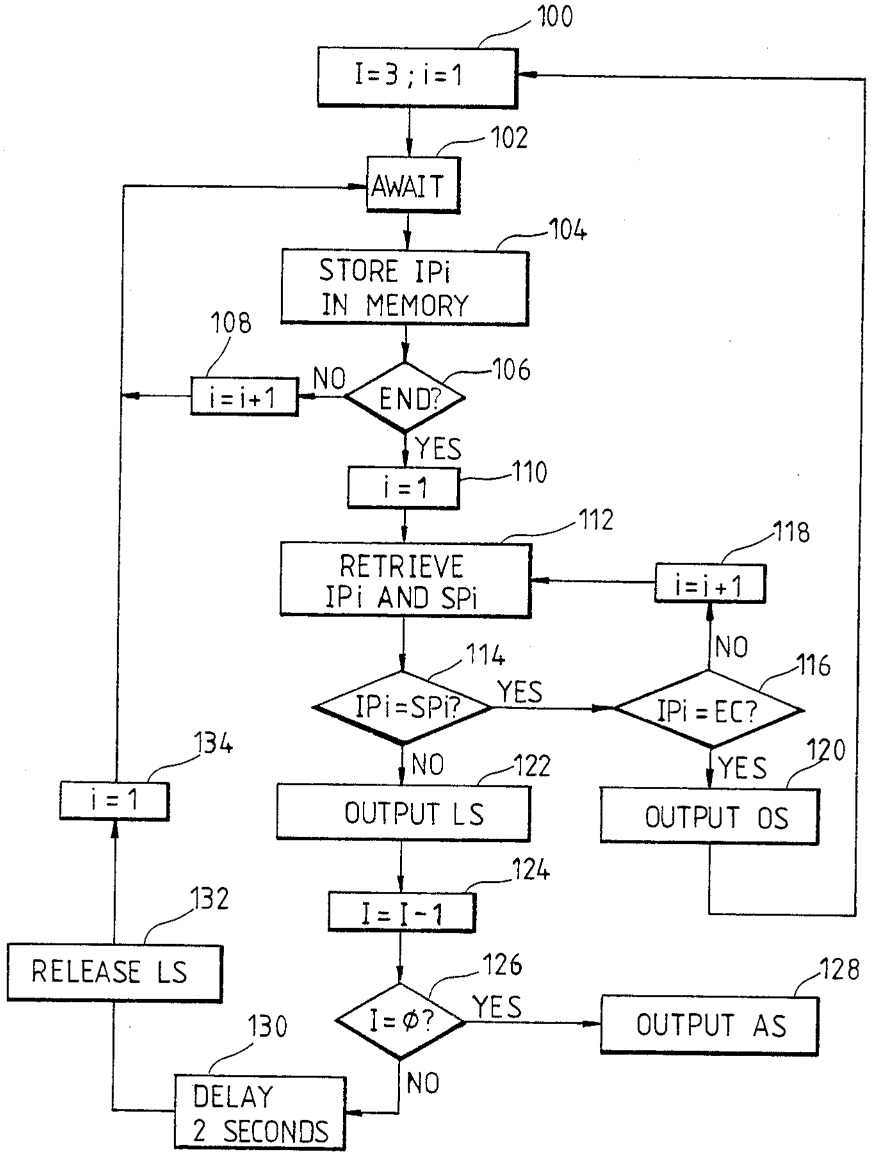
FIG. 2 is a flow chart of the comparison between a keyed-in passsword and a currently stored password, in accordance with the present invention.

With reference to FIG. 2, there is illustrated a flow chart of determining whether the keyed-in password is correct or not. Firstly, in block 100 a parameter I is set to three and a parameter i is set to one. In block 102 the CPU 10 awaits instruction from the user, and constantly scans the keyboard 30. In block 104 when the user keys in the first figure IPi (i=1) of password, the CPU 10 wll store it in the volatile memory 42. In determination block 106 the CPU 10 determines whether the key-in process of the password is over or not. Specifically, the CPU 10 compares the keyed-in password figure IPi with the inner code EC of the first function key (or over key) "*". If the IPi is not equal to the inner code EC of the key "*", the CPU realizes that the key-in process of the password is not over yet. Then the parameter i is increased by one, and the CPU 10 stores the sequentially keyed-in password figure IPi in memory 42 (blocks 108, 102 and 104). When the user depresses the over key "*", meaning that the key-in process is over, the IPi equals the inner code EC of the over key "*". Then the parameter i is reset to one in block 110. In block 112 and determination block 114 one keyed-in password figure IPi and one currently stored password figure SPi are retrieved in sequence from the memory, and compared with each other. When the comparisons between all of the figures of the keyed-in password and the current stored password are completed, and if the keyed-in password equals the current password (blocks 112, 116 and 118 and determination block 114), the CPU 10 will then output an open signal OS to the lock driving circuit 32 to open the lock (block 120).

If the keyed-in password does not equal the current password, including unequal number and inconsistent length, the CPU 10 will then output a light signal LS to the LED 36 to indicate that the keyed-in password is incorrect (block 122). In the preferred embodiment of the present invention, the password lock permits the user three opportunities to key in the correct password. Therefore, if determination block 126, after having subtracted one from the parameter I (block 124), determines that the number of times an incorrect password has been keyed in equals three. The CPU 10 will then output an alarm signal AS to the alarm driving circuit 34 to drive the alarm system (block 128). If it does not equal three, the CPU 10 will then delay two seconds to release the light signal LS (blocks 130 and 132). Specifically, the LED 36 will be turned on for two seconds which is long enough to catch the user's attention. In block 134 the parameter i is then reset to one, and thereafter the CPU 10 awaits further instructions from the user (block 102).

The current password mentioned above may be an original password or a reset password. The original password is stored within the non-volatile memory 40, and the reset password is reset by the user from the keyboard 30 as desired and is stored within the volatile memory 42. The priority of the reset password is higher than that of the original password. The original password is used should the commercial power and the chargeable battery all fail, resulting in the loss of the information stored in the volatile memory 42, and an external power is connected to the password lock through the receptacle on the password lock.

Figure 3:
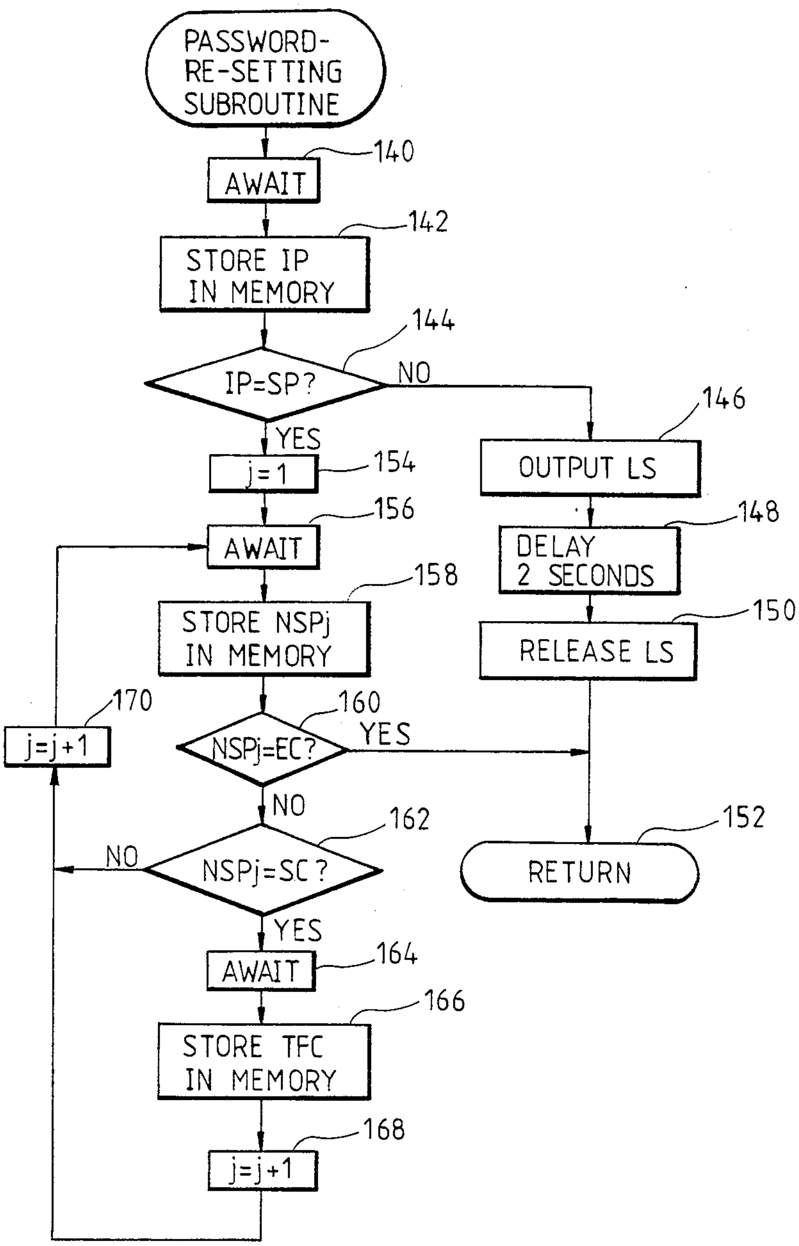
FIG. 3 is a flow chart of the resetting of a new password, in accordance with the present invention.

The preferred embodiment of the present invention is designed to allow the user to enter into the password-resetting subroutine as shown in FIG. 3 by depressing the second function key '#' to send a password-setting signal to the CPU 10 within a predetermined period of time, for example five seconds, after the lock is opened. Then the user must key in the correct password again (blocks 140 and 142, and determination block 144). Since the comparison between the keyed-in password and the current password is the same as the manner described above, further detailed descriptin is unnecessary. If the keyed-in password is incorrect, the LED 36 will be turned on for two seconds, and then the process returns to the main program (blocks 146, 148, 150 and 152). In this case, the password is not reset. If the keyed-in password is correct, a parameter j is set to one (block 154), and the CPU 10 awaits the user's key-in (block 156). When the user depresses any key representing a new-setting password figure NSPj, the CPU 10 will store it in the volatile memory 42 (block 158). In determination block 160 the NSPj is compared with the inner code EC of the first function or over key "*" to determine whether the key-in process is over or not. If over, the process returns to the main program, and the password-resetting process is completed.

If the NSPj does not equal the inner code EC of the key "*", the NSPj is further compared with the inner code SC of the second function key "#" to determine whether this figure of the password wants to vary with time. At this stage the second function key "#" is used to send a signal acting as a varying-password-setting code to the CPU 10, contrasting with the above-mentioned same signal acting as a password-setting code. If the current NSPj does not equal the inner code SC of the key "#", it must be a numeral. Therefore the parameter j is increased by one, and then the CPU 10 awaits the next keyed-in password figure NSPj (blocks 170 and 156). If the current NSPj equals the inner code SC of the key "#", it means that the user wants this figure of the password to vary with the time indicated by the display 52. Then the user must key in a symbol selecting code TFC to determine with which figure of the time the password figure will vary. In this preferred embodiment, the user can depress one of the numeral keys "1" to "4" respectively representing that this figure of password varies with ten-hour units, one-hour units, ten-minute units or one-minute units. The CPU 10 also stores the symbol selecting code TFC into the memory (blocks 164 and 166). Then the parameter j is increased by two (blocks 168 and 170) and the CPU 10 awaits the next keyed-in password figure (block 156).

Now, an exemplar is illustrated here to facilitate understanding of the varying-with-time password of the present invention. Firstly, the user depresses the second function key "#" within five seconds of the lock being opened to request resetting of password. Thereafter, he keys in the correct current password, and then depresses the keys "3", "#", "2", "#", "3" and "*" in sequence. In accordance with the above description, the reset password is a three-figure password, and its hundred or first figure equals 3, its ten or second figure varies in units of one hour of the time displayed by the display 52, and its unit or third figure varies in units of ten minutes of the time. For example, when the user wants to open the lock, and the displayed time is "12:50" (ten minutes to one o'clock, p.m.), the correct current password is "325". If the display time is "17:45" (fifteen minutes to six o'clock, p.m.), the correct password is "374".

Since the present invention is so designed to enable the password to vary with time, the operation in the block 112 of FIG. 2 must include the following steps: (a) determining whether the SPi equals the inner code SC of the second function key "#"; (b) if the SPi does not equal the inner code SC of the key "#", comparing the SPi with the IPi (determination block 114 in FIG. 2); and (c) if the SPi equals the inner code SC of the key "#", retrieving the symbol selecting code TFC from the memory, and in response to the retrieved symbol selecting code TFC retrieving the number of a proper symbol of time from the memory to compare with the IPi in determination block 114. Moreover, the determination block 144 must also include the above steps.

Accordingly, the password of the computer-controlled password lock of the present invention can be set to vary with time, and its length can be adjusted as desired. The setting of password is more flexible than the conventional password lock, and the password is more difficult to guess.

It should be noted that although in the preferred embodiment the CPU measures the real time, the CPU 10 may measures its own time or simply create a variable random number, and then display it for the user to determine the correct password.

While the invention has been described in terms of what is presently considered to be the most practical and preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A computer-controlled password lock system having a lock drivig circuit and a computer coupled thereto, comprising: keyboard means for entering a keyed-in password; timer means for establishing a time-varying symbol; indicator means coupled to the timer means for indicating the time-varying symbol; memory means for storing a password formed by a plurality of coded symbols; data processing means coupled to the timer means and the memory means for replacing at least one of the coded symbols of the preset password stored in the memory means with the time-varying symbol to form a current password; comparator means coupled to the memory means for detecting coincidence between the keyed-in password and the current password; and means interconnecting the comparator means with the lock driving circuit for generating a lock opening signal in response to said detection of coincidence, said computer further including alarm means coupled to the comparator means for generating an alerting signal in response to non-coincidence between the keyed-in password and the current password, the time varying symbol established by the timer means including at least two variable numerical codes, the plurality of coded symbols of the preset password stored in the memory means including a varying password setting code and a symbol selecting code, said data processing means including means for retrieving the preset password stored in the memory means when said keyed-in password is entered and means for detecting said a varying password setting code and a symbol selecting code to replace at least two different coded symbols of the preset password.

2. The computer controlled password lock as claimed in claim 1, further comprising means for resetting the current password stored in the memory means through the keyboard means.

* * * * *